(12) United States Patent
Rosengren et al.

(10) Patent No.: US 9,628,834 B2
(45) Date of Patent: Apr. 18, 2017

(54) METHOD AND SYSTEM FOR PLAYBACK OF MOTION VIDEO

(71) Applicant: AXIS AB, Lund (SE)

(72) Inventors: Bjarne Rosengren, Södra Sandby (SE); Fredrik Hugosson, Lomma (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/616,971

(22) Filed: Feb. 9, 2015

(65) Prior Publication Data
US 2015/0264411 A1    Sep. 17, 2015

(30) Foreign Application Priority Data
Mar. 11, 2014   (EP) .................................. 14158796

(51) Int. Cl.
| | |
|---|---|
| H04N 21/235 | (2011.01) |
| H04N 21/2365 | (2011.01) |
| H04N 21/418 | (2011.01) |
| H04N 21/4402 | (2011.01) |
| H04N 21/442 | (2011.01) |
| H04N 21/462 | (2011.01) |
| H04N 21/6373 | (2011.01) |
| H04N 21/6379 | (2011.01) |
| H04N 21/2387 | (2011.01) |
| H04N 5/783 | (2006.01) |
| H04N 21/2383 | (2011.01) |
| H04N 21/2747 | (2011.01) |

(Continued)

(52) U.S. Cl.
CPC ......... *H04N 21/2387* (2013.01); *H04N 5/783* (2013.01); *H04N 7/183* (2013.01); *H04N 21/2383* (2013.01); *H04N 21/2747* (2013.01); *H04N 21/4184* (2013.01); *H04N 21/4223* (2013.01); *H04N 21/4382* (2013.01); *H04N 21/6587* (2013.01)

(58) Field of Classification Search
None
See application file for complete search history.

(56) References Cited

U.S. PATENT DOCUMENTS

| | | | |
|---|---|---|---|
| 6,012,091 A | * | 1/2000 | Boyce ..................... G06T 9/004 348/E5.008 |
| 6,445,738 B1 | | 9/2002 | Zdepski et al. |

(Continued)

*Primary Examiner* — Brian T Pendleton
*Assistant Examiner* — Jean D Saint Cyr
(74) *Attorney, Agent, or Firm* — Volpe and Koenig, P.C.

(57) ABSTRACT

Playback of motion video is presented. A method may comprise requesting streaming of a specific motion video sequence from a storage device to a playback device, streaming motion video data of the requested motion video sequence, displaying the streamed motion video data as the streamed motion video data is received, and sending a request of change of playback speed to the data storage device. In response to the request, decoding, in the data storage device, motion video data from a temporal position in the specific motion video sequence that has not yet been streamed to the playback device, compressing, in respect of time, the decoded motion video data, encoding the compressed motion video data using an encoding scheme corresponding to an encoding scheme used to encode the specific motion video sequence, and continue streaming the motion video sequence to the playback device using the compressed and encoded motion video data.

15 Claims, 6 Drawing Sheets

(51) Int. Cl.
*H04N 21/4223* (2011.01)
*H04N 21/438* (2011.01)
*H04N 21/6587* (2011.01)
*H04N 7/18* (2006.01)

(56) References Cited

U.S. PATENT DOCUMENTS

| | | | | |
|---|---|---|---|---|
| 6,754,715 | B1* | 6/2004 | Cannon | H04L 29/06 348/E5.008 |
| 2002/0016970 | A1 | 2/2002 | Negishi et al. | |
| 2002/0023269 | A1 | 2/2002 | Negishi et al. | |
| 2013/0016224 | A1* | 1/2013 | Davis | H04N 17/004 348/192 |
| 2014/0079368 | A1* | 3/2014 | Sasaki | H04N 5/0736 386/207 |
| 2015/0113561 | A1* | 4/2015 | Keys | H04N 5/76 725/32 |

* cited by examiner

US 9,628,834 B2

METHOD AND SYSTEM FOR PLAYBACK OF MOTION VIDEO

CROSS REFERENCE TO RELATED APPLICATION

This application claims the benefit of European Patent Application No. 14158796.4 filed on Mar. 11, 2014, which is incorporated by reference as if fully set forth.

FIELD OF INVENTION

The present invention relates to a video playback system in which motion video data to be played back is stored in a motion video storage device enabled to send motion video data to be played back to a motion video playback device via a communication network. Further, the present invention relates to a method for playback of motion video wherein a motion video stream is requested by a motion video playback device from a motion video storage device via a communication network. The requested motion video stream is then streamed from the motion video storage device to the motion video playback device.

BACKGROUND

Most video playback systems and schemes of today implements some kind of visual search functionality like fast forward function or a skip function arranged to skip between predetermined bookmarks or a predetermined time slot, e.g. 30 seconds of video. This type of functionality is desirable in most video playback systems, but is particularly desirable in surveillance applications where an operator may have to browse through hours of video in order to find a motion video sequence of interest.

In systems where the motion video data is delivered to the motion video playback device from the motion video storage device via a computer network this type of visual search functionality generally is implemented in the client only, i.e. the motion video data for normal playback is streamed or downloaded to the motion video playback device which then is playing back the received motion video data in a playback speed requested by the user. In the case the requested playback speed differs from the playback speed of the streamed motion video, the client changes the playback speed. Alternatively, the motion video storage device stores multiple motion video streams for different playback speeds. However, this later scheme requires an increased amount of storage space in relation to a system storing a motion video stream in one playback speed only.

In U.S. Pat. No. 6,012,091 (the '091 Patent), a video telecommunications server arranged to store video messages and to transmit video messages to a user upon request is described. As described in the '091 Patent, a normal scenario in messaging systems is that the user is playing a video message at normal speed and may wish to return to a previous location in the video at fast reverse in order to replay at normal speed to review some missed action in the video message. In order to enable such rewind functionality, the server stores a sequence of properly decoded frames comprising, for example, every nth decoded frame where n represents the speed-up rate, for example, where n equals 4 or 8, and finally encodes the sequence comprising every nth frame as a fast scan video signal for transmission to the user's video decoder and display. A fast forward bit stream is encoded using only every nth frame, as these frames are independent frames which are not relying on data from other frames in to order represent an image, i.e. fully specified images, and a reverse bit stream is encoded using every nth frame in reverse order.

SUMMARY

An object of the present invention is to enable change of playback speed of a recorded motion video in systems that are limited in bandwidth and/or in storage capacity.

In particular, according to one aspect, a method for playback of motion video comprises requesting, via a communication network, streaming of a specific motion video sequence from a motion video storage device to a motion video playback device, streaming motion video data of the requested motion video sequence from the motion video data storage device to the motion video playback device, displaying the streamed motion video data on a display connected to the playback device as the streamed motion video data is received at the playback device, sending a request of change of playback speed to the motion video data storage device. In response to receiving the request of change of playback speed at the motion video data storage device, the following acts are performed: decoding, in a decoder of the motion video data storage device, motion video data from a temporal position in the specific motion video sequence that has not yet been streamed to the motion video playback device, compressing, in respect of time, the decoded motion video data, encoding, in an encoder of the motion video data storage device, the compressed motion video data using an encoding scheme corresponding to an encoding scheme used to encode the specific motion video sequence, continue streaming said motion video sequence to the motion video playback device using said compressed and encoded motion video data.

One advantage of making the motion video storage device compress the decoded motion video in respect of time and then stream the compressed motion video is that a change in playback speed, such as a fast forward functionality, may be effected without the delivering network experiencing an increased network load. Another advantage is that the playback device may provide functionality relating to change in playback speed using a simple decoding process only implementing playback at one frame rate. For example, let us assume the network connecting the motion video storage device and the motion video playback device has a maximum capacity of 100 Mbit/s. If a motion video storage device is requested to deliver a motion video stream of 10 Mbit/s, there is plenty of bandwidth left on the network. However, if the operator would like to fast forward at 16 times the original playback speed, then the motion video storage device has to stream the motion video 16 times faster. This results in a motion video stream of 16×10 Mbit/s=160 Mbit/s, which is higher than the capacity of the network. Hence, it is not possible to fast forward at that speed unless you implement the invention and provide a normal data rate motion video stream representing a fast forward playback of 16 times the normal play back speed.

According to another embodiment said compressing, in respect of time, of the decoded motion video data is performed before the motion video data is sent on an internal data bus of the motion video storage device. An advantage of performing this compression before the data is sent to the internal bus is that the limitations of transfer rates on the internal bus will have less impact on the possibilities to generate high playback speeds. In many applications the internal data bus may otherwise hinder generation of higher play back speeds or in worst case any increased playback speed.

In a further embodiment the compressing, in respect of time, of the decoded motion video data comprises selecting every nth frame of the decoded motion video data for compressing, in respect of time, the motion video data, wherein n is a value relating to the requested playback speed. The advantage of compressing in respect of time in this way is that the method is uncomplicated and may be easily implemented.

In another embodiment, motion video data of the specific motion video sequence is set to be played back at a predetermined frame rate and wherein the playback frame rate is not changed when the change of playback speed is executed. Accordingly the perceived speed of the playback is changed without change in the data rate over the network, especially when fast forward of the motion video is desired. The constant frame rate delivered makes the load on the network substantially constant even when the playback speed is increased, e.g. a motion video sequence representing a minute in real time is played back in 30 seconds.

In yet another embodiment the motion video data of said specific motion video sequence stored at the storage device includes subsets of motion video data, each motion video data subset representing an image frame in the motion video sequence, wherein at least some of the motion video data subsets does not include enough motion video data for recreating the image frame it represents without relying on motion video data from other motion video data subsets of the motion video sequence, wherein said decoding of motion video data includes generating motion video data subsets each including enough information to recreate at least each of the image frames selected in the act of compressing without using motion video data from another subset. The method enables the application of the above advantages on motion video data compressed using prediction, i.e. each image frame does not necessary include all image data required to reconstruct the image frame, but the process relies on image data from a previously decoded image frame or image frames.

According to one embodiment the motion video data of said specific motion video sequence stored at the storage device includes subsets of motion video data, each motion video data subset representing an image frame in the motion video sequence and the image frames being sequentially related in chronological order, and wherein the receipt of the request of change of playback speed initiates said decoding of motion video data subsets arranged later in the chronological sequence than the motion video data subset presently being processed for streaming. The advantage of this embodiment is that change of playback speed is enabled anywhere, chronologically speaking, in the motion video stream presented, i.e. if the motion video is played back and the operator after a while requests increased playback speed, the playback speed is increased from a point in time that is later than the image frame currently being viewed.

In one embodiment the first motion video data subset being decoded is the motion video data subset representing the image frame being the next frame in the chronological sequence in relation to the motion video data subset presently being processed for streaming.

According to another embodiment n is a value greater than or equal to two.

In a further embodiment the motion video storage device is a network enabled camera including an image sensor and the motion video sequence is a motion video sequence captured by said image sensor. One advantage of performing the changing of the playback speed in a motion video storage device that is a network enabled camera is that image processing devices and encoders of the networked camera that is used in the capturing and encoding of motion video data may be used for the playback speed changing process as well.

According to one embodiment the method further comprises receiving motion video to be stored at the motion video storage device from an image capturing device via a direct connection between the image capturing device and the motion video storage device.

In another embodiment a motion video data subset corresponding to an image frame received at the motion video playback device is discarded from the motion video playback device when the image frame has been displayed.

According to a further aspect a motion video playback system for remote playback is presented. The motion video playback system comprises a motion video storage device, a motion video playback device connected to the motion video storage device via a computer network, wherein the motion video playback system includes a means for indicating a change of playback speed and sending to the motion video storage device a request for a change of playback speed, the motion video storage device including a decoder and an encoder for converting motion video data representing a first play back speed and having a first playback frame rate into motion video data representing a second playback speed having a second playback frame rate, the second playback speed being higher than the first playback speed and the second playback frame rate being less than a playback frame rate required for playing the motion video data representing the first playback speed at the second playback speed, and the motion video storage device further includes a switching means for switching from sending the first motion video stream to sending the second motion video stream.

In one embodiment the decoder in combination with the encoder of the motion video storage device are arranged to convert said first motion video stream into the second motion video stream, wherein the second motion video stream is compressed in respect of time in relation to said first motion video stream.

In a further embodiment the decoder and the encoder are arranged to form the second motion video stream from every n:th motion video frame of the first motion video stream starting at a given position in the first motion video stream and wherein n is larger than or equal to two.

In another embodiment wherein the second playback frame rate is equal to or less than the first playback frame rate.

In yet another embodiment the motion video storage device is a network enabled motion video camera.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings.

Further, in the figures like reference characters designate like or corresponding parts throughout the several figures.

DETAILED DESCRIPTION OF THE PREFERRED EMBODIMENTS

In the context of this document playback is to be understood as the act of causing recorded motion video to be seen again. Hence, a playback device is a device that may be used to playback motion video. Moreover streaming is to be understood as transfer of data, e.g. motion video, in a continuous stream of data for substantially immediate playback and discarding of motion video frames as they have been displayed. An interrupted stream of data that is interrupted during transfer has to be set up as a new transfer of streaming data in order to continue the streaming transfer of data.

Figure 1:
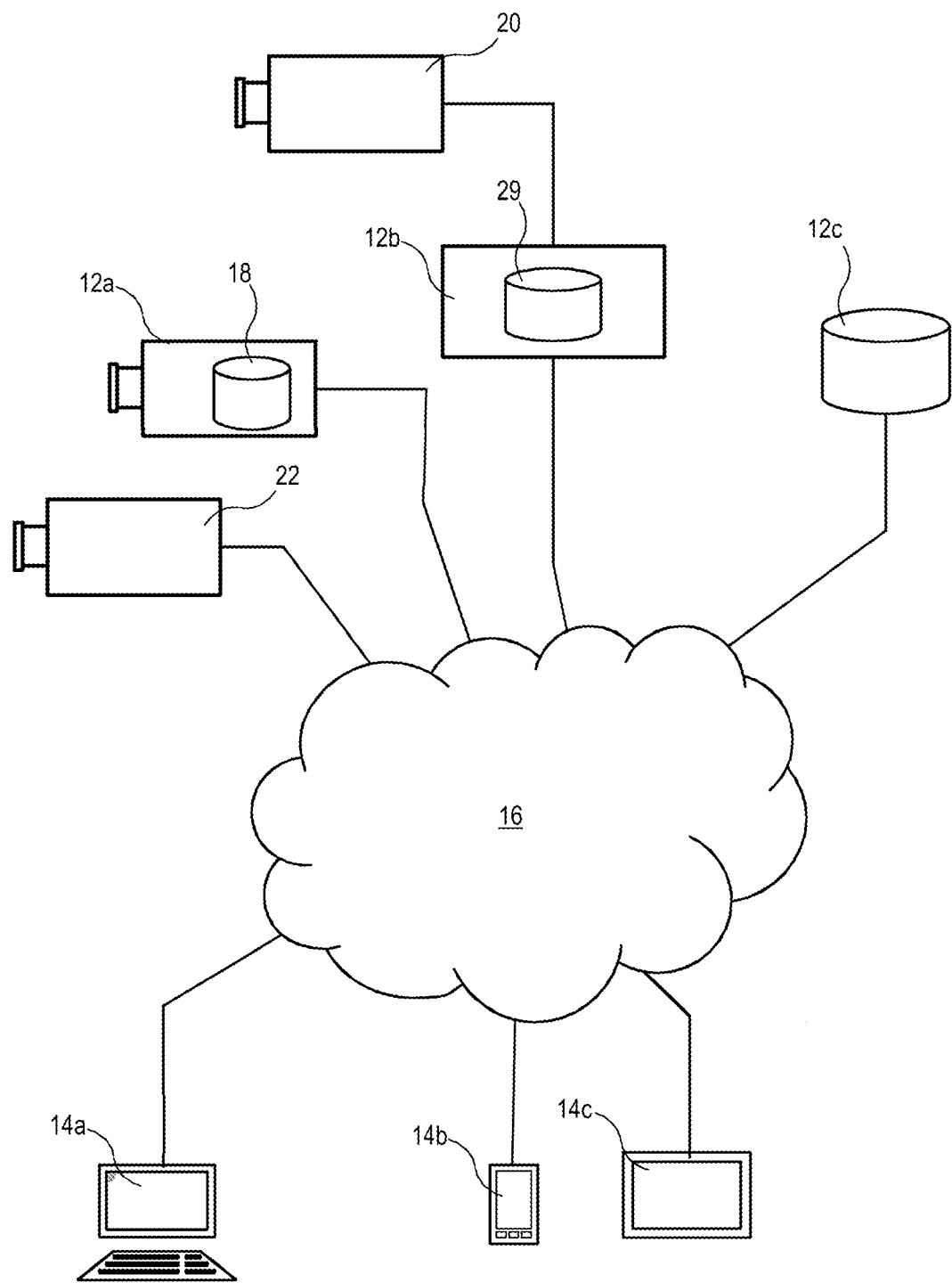
FIG. 1 shows a schematic block diagram over various implementations of a system for playback of motion video according to embodiments of the invention.

A system implementing the present invention may for example include means and devices as depicted in FIG. 1. A system according to the invention includes a motion video storage device 12, a motion video playback device 14 and a network 16 connecting at least the motion video storage device 12 and the motion video playback device 14. The motion video device 12 is arranged to store motion video and to perform streaming of a requested motion video. The request of the motion video and the streaming of the video are performed via the network 16. The recipient of the streaming video is a motion playback device arranged to display the streaming content and discard motion video frames as they are displayed.

The motion video storage device 12 may be a motion video camera 12a capturing motion video of a scene or it may be a motion video encoder 12b arranged to encode analogue motion video from an analogue motion video camera 20 into digital motion video. In order to store motion video data the motion video camera 12a and the motion video encoder includes an integral storage device 18 or a physical interface directly connected to a detachable storage device 18. Examples of integral storage devices 18 are non-volatile memory such as a flash memory, an internal hard drive, a random access memory, etc. Example of detachable storage devices 18 are a memory card, e.g. a Compact Flash card, a Memory Stick, a Secure Digital (SD) card, etc., a USB flash drive, an external hard drive or other storage device connected directly to the motion video camera 12a, etc. The external hard drive or other storage device being connected directly to the motion video camera 12a may be connected using a USB-connector (Universal Serial Bus), a serial connector, a parallel connector, a PCI connector, an ePCI connector, a SATA connector, an eSATA connector, a mSATA connector, a FireWire connector, a Thunderbolt connector etc.

The motion storage device 12 may also be a motion video streaming server 12c including both storage capabilities and network interface. Motion video streaming servers are known to the person skilled in the art. The motion videos stored on the motion video server 12c may originate from any one of the motion video camera 12a or the motion video encoder 12b. However, the system may also include a networked motion video camera 22 without extended storage capabilities.

The motion video playback device 14 may be any network connected device enable to decode and display motion video, e.g. a computer 14a, e.g. a laptop computer, a desktop computer, a PC, a workstation, a dedicated surveillance computer, a general computer, etc. The motion video playback device 14 may also be a smaller and probably less powerful computer, e.g. a mobile phone or PDA 14b, a tablet 14c, a smart TV, etc., or it may be a monitor, a display, or any other displaying means that is network enabled. The playback device may include a program for playback of motion video retrieved via the network 16. The program being arranged to present a control interface enabling an operator to specify a motion video streamed from or stored at a motion video storage device 12 and to request the motion video at a selected playback speed. The selected playback speed is sent to the motion video storage device 12 and it may be altered during playback. The program may be a software program, a software application, plugin for another software program, e.g. a plugin for a web-browser, etc.

Alternatively, the control of the playback may be performed using a separate device, not shown in the figures, connecting directly to the motion video storage device 12 instead of to the motion video playback device 14. This separate device may then be arranged to present an interface enabling control of the motion video being delivered to the motion video playback device 14. For example, the interface may include a change of playback controller and the separate device may be arranged to send a request of change of playback speed directly to the motion video storage device 12 instead of sending it via the motion video playback device 14. The separate device may be a smart phone, a mobile phone, a dedicated remote controller, etc.

The network 16 may be any type of network that allows electronic devices to exchange data. The network may be wired, wireless or any combination thereof. It may be implemented by means of any known network protocol allowing the exchange of data between the electronic devices of the system, e.g. Ethernet (IEEE 802), Internet Protocol (IP) combined with TCP, UDP, or FTP, Synchronous optical networking (SONET), Synchronous Digital Hierarchy (SDH), Asynchronous Transfer Mode (ATM), etc. The system may be implemented using any size network, e.g. a Local Area Network (LAN) or a Wide Area Network (WAN).

The motion video camera 12a, also functioning as a motion video storage device 12, includes means and devices of a general networked motion video camera for capturing motion video of a scene and deliver the captured motion video over a network. Now referring to FIG. 2, the motion video device may for example include a lens 50 focusing light from the scene to be captured onto an image sensor 52. The signal generated by the image sensor 52 from the light of the scene is then processed by a signal processor 54. The signal processor 54 outputs a digital image signal which is processed by an image processor 56. The output from the image processor 56 is a stream of images representing a motion video. This motion video is then encoded by an encoder 58 and sent to a network interface 60 in order to send the motion video over the network 16 to a receiver of motion video, e.g. a motion video playback device 14. Alternatively the encoded motion video is stored in the storage device 18 of the motion video camera 12a.

Moreover, the motion video camera 12a includes a decoder 62 arranged to decode motion video from the storage device 18 and then pass the decoded motion video on to the image processor 56 in order to change the relation between the frame rate and the time flow depicted by the resulting motion video. The motion video camera 12a includes a central processing unit 64 (CPU) of some sort in order to perform general tasks in the motion video camera. Some of the more specific image processing tasks may also be performed by the CPU 64 instead of by a dedicated processor or logic circuit. Further, the motion video camera 12a may include a volatile memory 66 for temporary storage of data during operation. A non-volatile memory 68 for storage of program code to be executed may also be included, but the storage device 18 may store this data as well as the motion video. The motion video camera also includes an internal data bus 69 which is arranged to transport data between internal devices, e.g. between a storage or memory devices 18, 66, 68 and a functional device 52, 54, 56, 58, 60, 62, 64.

In one embodiment the switching between transmitting the stored motion video and a converted motion video is controlled by the CPU 64 which in such an embodiment instructs decoder 62, image processor 56, encoder 58 and the network interface to convert motion video and send the converted video over the network.

The dashed lines from the storage device 18 and the decoder 62 and the decoder 62 and the image processor represent a data flow. However, the real path of the data is via the internal data bus 69.

The motion video encoder 12b operating as a motion video storage device 12 includes means and devices of a general motion video encoder arranged to receive analogue motion video signals from one or a plurality of analogue motion video cameras and to convert these analogue motion video signals to digital motion video. The digital motion video is made accessible via the computer network. For example, the motion video encoder may include substantially the same means and devices as the motion video camera showed in FIG. 2 except for the lens and the image sensor. Instead the motion video encoder may include an analogue motion video interface 70, see FIG. 3. The rest of the references numerals in FIG. 3 having corresponding numerals to the numerals in FIG. 2 and are already described in connection with FIG. 2.

The streaming server 12c operates as any known streaming server with the exception of this streaming server including an encoder and a decoder for converting motion video accessible for streaming.

Figure 4:
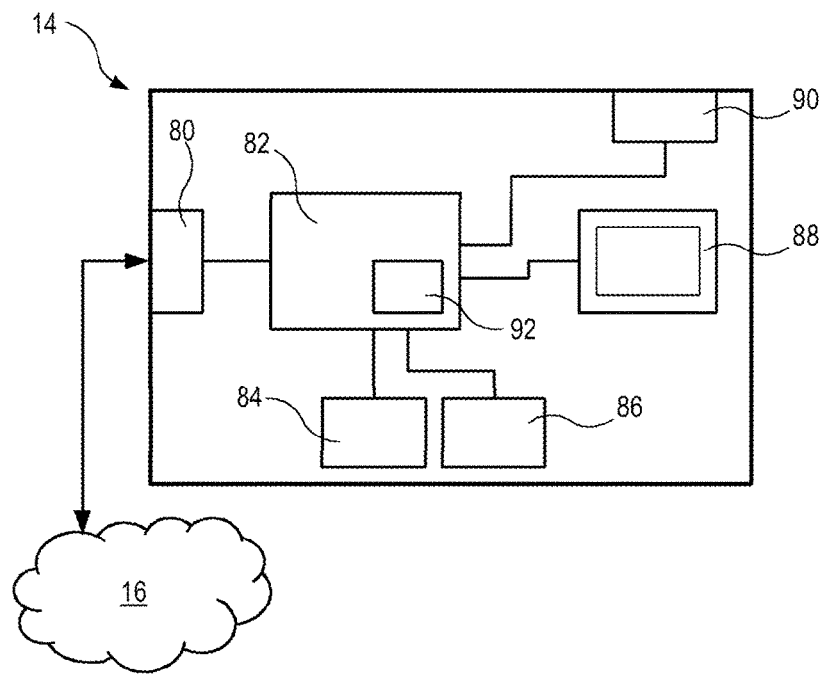
FIG. 4 shows a schematic block diagram of a motion video playback device according to one embodiment of the invention.

The motion video playback device 14 may be any device arranged to read a digital motion video stream, decode the motion video frames of the motion video stream and send them to a display device, being external to the motion video playback device 14 or being integrated in the motion video playback device 14. Now referring to FIG. 4, in one embodiment the motion video playback device 14 includes a network interface 80 connecting the motion video playback device 14 to the network 16, a central processing unit 82 for controlling operation of the motion video playback device network interface 14, a volatile memory 84 for temporary storage of data during operation, a non-volatile memory 86 for storing data and program code, e.g. the program code to be executed by the central processing unit 82, a display 88 and/or a display interface 90, and a video playback module 92.

In this specific embodiment the motion video playback module 92 is a program module that is executing in the central processing unit 82. The operation of the motion video playback device 14 will be described in more detail below. The interface of the motion video playback device includes at least actuation positions for requesting playback, change of playback speed, selection of motion video. The actuation positions may be physical buttons on the motion video playback device 14 or areas on a touch screen or a normal screen where the areas are associated in a control program running on the device with respective function.

According to one embodiment the means for requesting increased playback speed may be implemented in a module that is separate from the playback module itself. This is possible due to the fact that the motion video data provided to the motion video playback module appears to the computer as a normal speed motion video because the frame rate is not changing due to the increased playback speed. If the request of a change of playback speed is provided from another module or an entirely different device than the playback module an identifier of the motion video stream should be sent along with the request for a change in playback speed.

Figure 5:
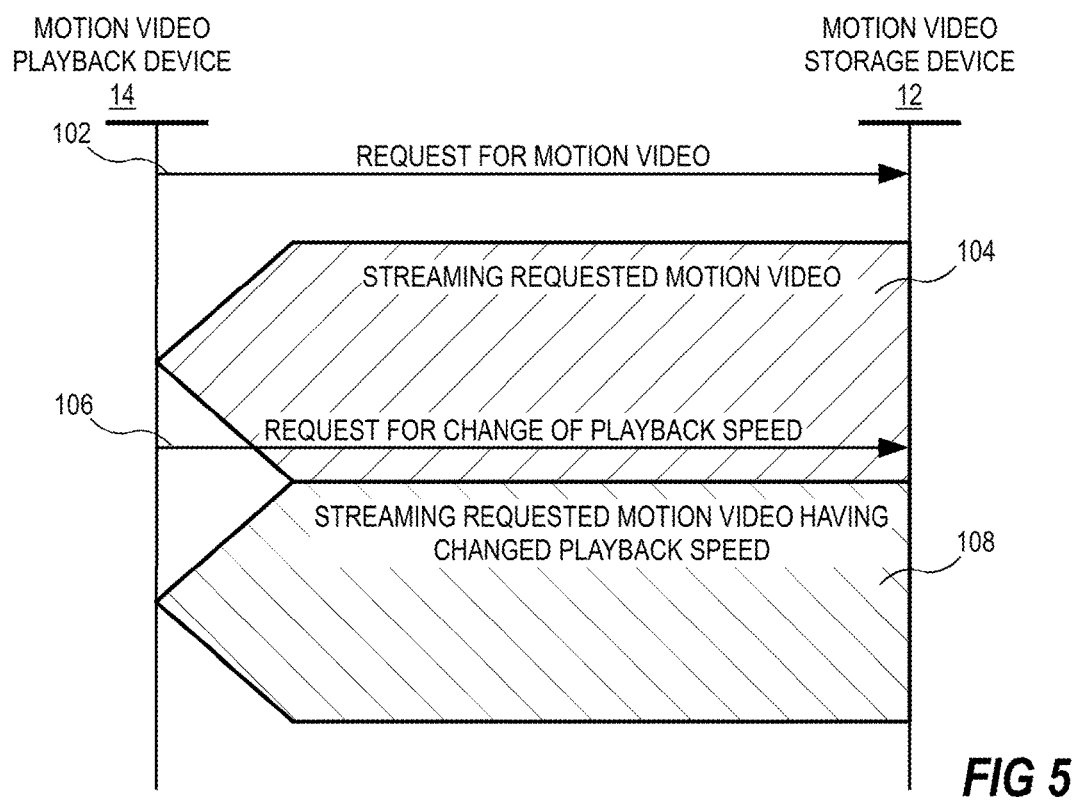
FIG. 5 shows a timing diagram representing an example of communication, according to one embodiment of the invention, between a motion playback device and a motion video storage device.

In FIG. 5 a timing diagram of a possible signaling sequence between a motion video playback device 14 and a motion video storage device 12 according to one embodiment is showed. The signaling starts with the motion video playback device 14 sending a request for motion video 102 to the motion video storage device 12 that is serving the requested motion video. In response to the request the motion video storage device 12 begins sending the requested motion video as a motion video stream 104 to the motion video playback device 14. In the scenario described in FIG. 5 the motion video playback device 14 then sends a request for a change in playback speed 106, e.g. fast forward at a specific rate. The motion video storage device 12 responds by changing the streaming motion video to a streaming video having the requested playback speed 108. This changing of the streaming motion video to a streaming motion video having the requested playback speed may be performed without interrupting or terminating the ongoing streaming communication but continue delivering the motion video stream of the requested playback speed in the ongoing streaming communication that was set up when the playback of the video was requested. In this way the motion video playback device 14 does not need to recognize the change of playback speed in any way as the stream of motion video data having the higher playback speed is delivered in the initial communication stream and no new request for setting up a new communication stream is necessary.

Figure 6:
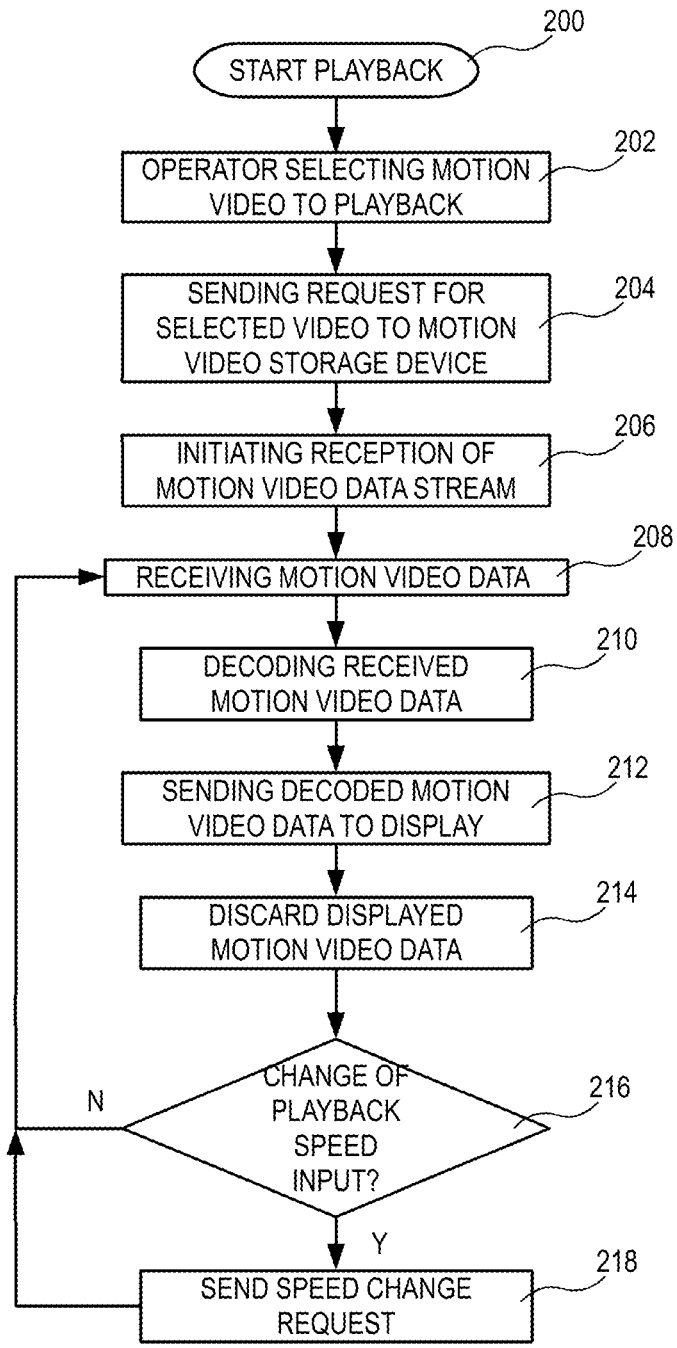
FIG. 6 shows a flowchart over a motion video playback process of a motion video playback device according to one embodiment of the invention.

According to one embodiment the motion video playback device implements a process as described in FIG. 6 in order to generate the communication described in FIG. 5 and other communication sequences resulting from embodiments of the invention. The playback of a motion video 200 is started by an operator selecting a motion video to view, step 202, i.e. a motion video to playback on the motion video playback device 14. In response to the selection the motion video playback device 14 sends over the network 16 a request for the selected motion video to the motion video storage device storing the motion video requested, step 204.

Then the reception of a motion video data stream is initiated, step 206, and streamed motion video data is starting to arrive at the motion video playback device 14 where it is received, step 208. The received motion video data is decoded, 210, and sent to the motion video display 88, 90, step 212. When the motion video data has been sent to the display 88, 90 the motion video data is discarded, step 214. This is the normal operation of streaming data, i.e. the streamed data is displayed directly and then it is obsolete and therefore discarded.

During the playback of the selected motion video data the operator may select to fast forward the motion video or to view at an alternative playback speed. This change of playback speed may be achieved by providing an input of a change in playback speed via a mechanical interface including buttons on the motion video playback device 14 or via a graphical interface presented on a display 88, 90 integrated in or connected to the motion video playback device 14. If no input relating to change of playback speed is detected, step 216, the process returns to step 208 where additional streamed motion video data of the requested motion video is received. However, if an input relating to a change of playback speed is detected, step 216, then a request for change of playback speed is generated and sent to the motion video storage device streaming the motion video data, step 218. The request for change of playback speed may include a value indicating the requested playback speed. When the speed change request is sent the process returns to step 208 where additional streamed motion video data of the requested motion video is received.

Alternatively, the process of receiving and displaying the requested motion video data may execute in one process while the detection of a playback speed request and subsequent sending of a playback speed request may execute in a separate process.

Figure 7:
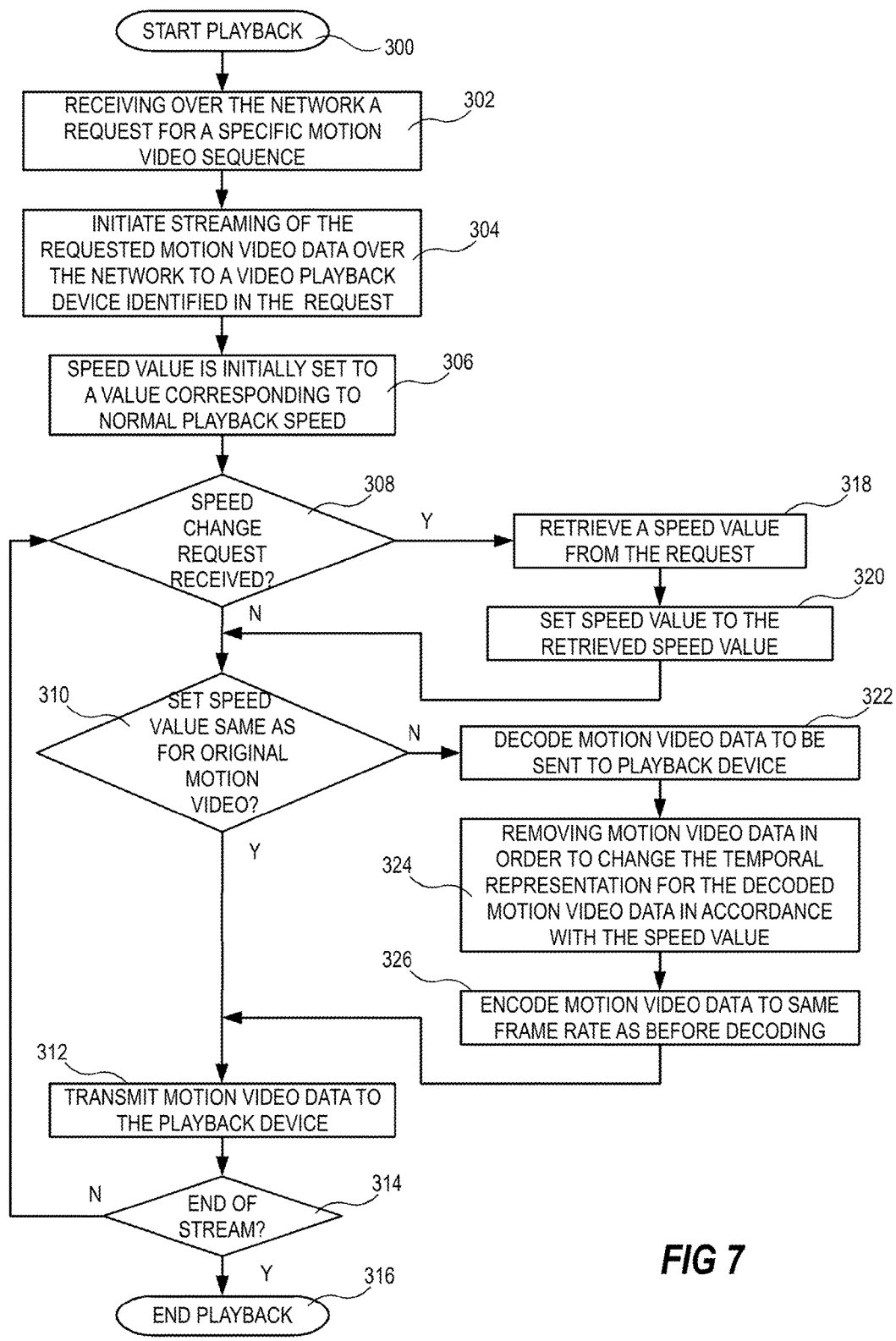
FIG. 7 shows a flowchart over a motion video playback process of a motion video storage device according to one embodiment of the invention.

The motion video storage device 12 may, according to one embodiment, implement the process described in FIG. 7 in order to deliver motion video to a motion video display device. In the motion video storage device 12 the playback process 300 is started when a request for a specific motion video sequence is received over the network 16, step 302. The motion video storage device 12 then initiate streaming of the requested motion video data over the network 16 to the motion video play back device 14 identified in the request, step 304. The motion video request is not necessarily sent to the motion video storage device 12 from the motion video playback device 14, but may be sent from another device identifying the motion video playback device as the recipient of the motion video to be played back. Initially a value for the playback speed of the requested motion video is set to the playback speed of the stored motion video, step 306. Hence, if a normalized system in which 1 corresponds to normal playback speed of the requested motion video, the value is set to 1.

Then the process check if a speed change request has been received from the motion video playback device, step 308. If no speed change request has been received, the process continues and checks if the set playback speed is the same as the speed of the stored motion video, step 310. If the set playback speed is the same as the playback speed of the stored motion video then the stored motion video is to be streamed without any changes to the playback speed of the motion video data to be sent and therefore the process continues to step 312 where motion video data is transmitted to the motion video playback device as part of the process of streaming the requested motion video data. Then the process checks if the end of the stream is reached, step 314, i.e. if there is no more data related to the requested motion video or if an input indicating that the streaming is to end has been received. If no more motion video data of the requested motion video data is to be streamed then the process ends, step 316. However, if more motion video data is to be streamed the process returns to step 308 to check for a change of playback speed request.

If a request for a change of playback speed is received and identified in step 308, then the speed value included in the request is retrieved from the request, step 318, and the playback speed value is set to the retrieved playback speed value, step 320.

Further, if the playback speed set in the motion video storage device is set to another value than the playback speed of the stored version of the requested motion video in step 310, the motion video storage device starts decoding motion video data that are to be sent to the requesting motion video playback device 14, step 322. Then the decoded data is processed so that the temporal properties of the motion video are changed in accordance with the set playback speed value, step 324. Then the processed motion video data is encoded to substantially the same frame rate as the stored motion video, step 326. The encoding scheme used is a coding scheme that results in motion video data that may be decoded using the same decoder as for decoding the original motion video data, i.e. a corresponding coding scheme is used. Then the encoded motion video data is transmitted to the motion video playback device in step 312. The motion video data after the encoding is typically less than the motion video data representing a corresponding time period before the decoding. The motion video data after the encoding may during specific and rare circumstances have the same size or even larger size than the motion video before decoding. However, such circumstances are rare and therefore we believe it is relevant to suggest that the converted motion video data is less than the corresponding data before decoding.

According to one embodiment the motion video data representing an increased playback speed and being delivered in response to a request of an increased playback speed is streamed in the same communication stream as the original motion video data was streamed in, i.e. no request for a new communication stream is required and the motion video storage device simply transfer the data in the already existing communication stream instead of disconnecting and setting up a new communication stream.

The processing of motion video data in order to generate a data stream having a different playback speed than the motion video file stored in the motion video storage device is resulting in motion video data, when encoded, that the receiver of the motion video data, in this case the motion video playback device 14, processes in the same way as it was processing the original motion video data sent and still the playback on a display shows a motion video played at a different speed than the speed of the originally recorded scene. Accordingly, one advantage of this system is that the motion video playback device does not need to perform any processing relating to playback speed and hence may be a simple decoder presenting the decoded motion video on a display. In case of increasing the motion video playback speed, the processing in the motion video storage device 12 is generating a motion video that presents an increased playback speed when decoded at normal rate at the motion video playback device. This may be achieved by compressing the motion video data in respect of time, i.e. making a sequence to be played back in a shorter time period than the original. In one embodiment this is achieved by removing motion video data from the decoded motion video data in the motion video storage device before encoding it for transmission to the motion video playback device 14, e.g. in step 324 in FIG. 7.

For example a doubling in playback speed may be achieved by removing every second motion video frame of the decoded motion video data before encoding it again, i.e. in steps 322-326 in FIG. 7, and then playing the new encoded motion video at the same frame rate as the original. A tripling of the playback speed may be achieved by removing two motion video frames in a row and performing encoding only on every third motion video frame of the decoded motion video data. This may also be described as every nth motion video frame is selected. Hence a doubling of playback speed is achieved for n=2 and for times playback speed is achieved for n=4 etc. Additional ways to achieve the increased playback speed may be considered by a person skilled in the art.

In an alternative embodiment the frame rate intended for the playback motion video is less than the original frame rate of the original motion video, even if the play back speed is increased. This may be achieved by deleting further image frames and indicating for the playback device the new frame rate.

In one embodiment the motion video data output from the decoder may be processed further in order to make the final motion video data to be sent over the network require less bandwidth. Examples of such processes are to blur the image frames before encoding, reducing noise in the image frames before encoding, change resolution, etc. In cases of blurring and noise reduction, typical encoders will generate less motion video data if the image frames includes less varying image frames.

Figure 2:
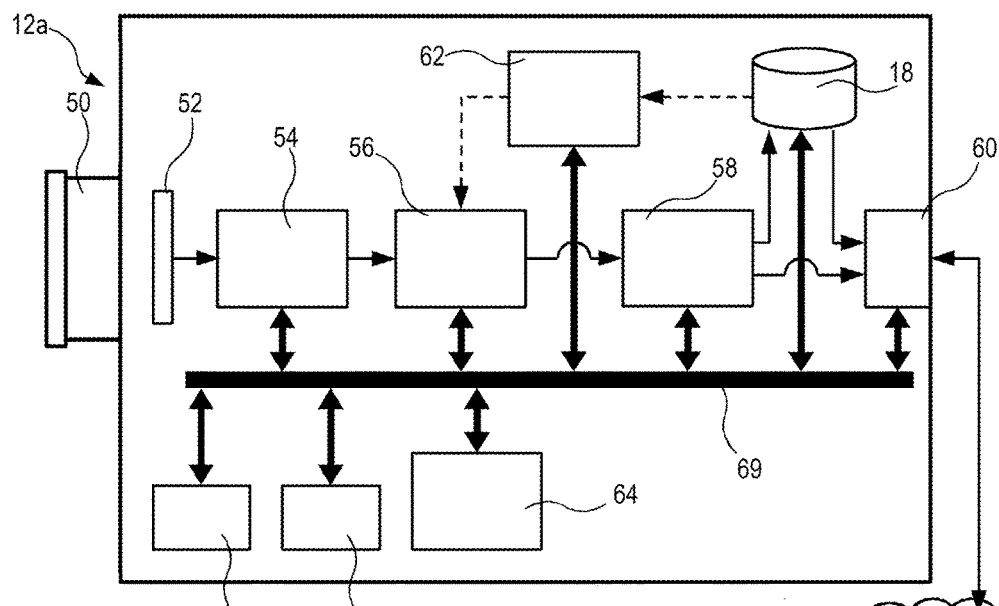
FIG. 2 shows a schematic block diagram of a motion video camera implementing a motion video storage device according to one embodiment of the invention.
Figure 3:
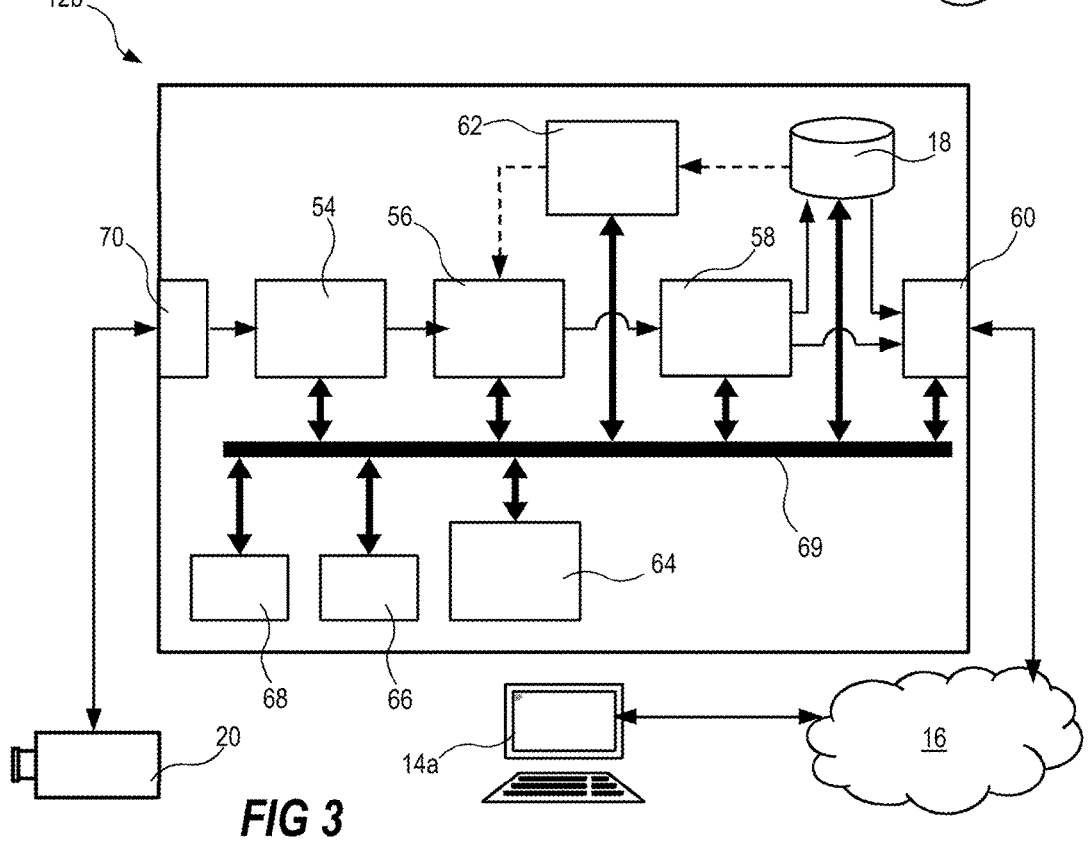
FIG. 3 shows a schematic block diagram of a video encoder implementing a motion video storage device according to one embodiment of the invention.

According to a further embodiment of the invention the decoder 62 included in the motion video storage device 12 and showed in FIG. 2 and FIG. 3 is arranged to not only decode motion video data as described in step 322 of FIG. 7 but to compress the motion video data before it is transmitted over any internal communication paths, e.g. the internal data bus 69. The compression performed may for example be a time based compression as discussed above, by which compression the resulting motion video data played back at a fixed frame rate will be perceived as being fast forwarded. This compression may be achieved as described in relation to step 324 in FIG. 7, by removing motion video data in order to change the temporal representation of the decoded motion video data in order to generate a motion video data stream having a perceived increased playback speed when played back at a normal frame rate. The advantage of performing this temporal compression of the decoded motion video data in the decoder before any decoded motion video data is transported via an internal data bus is that the traffic load on the internal bus is decreased in relation to if no such temporal compression is performed in the decoder and thereby making it possible to provide increased play back speed to a degree corresponding to the decreased traffic load of the internal bus. Hence, the play back speed may be increased further than would be possible otherwise due to limitations in data transport rate of the internal data bus 69.

In some cases the temporal compression of the decoded motion video data in the decoder is necessary in order to enable any change in playback speed at all. Such a case may be when the maximal transfer rate over the internal bus is substantially the same at the data rate of the decoded motion video. In these cases the transfer rate over the internal data bus 69 is too low for enabling transport of uncompressed motion video data at higher speed than normal playback speed.

According to one embodiment the temporal compression of the motion video is performed on the decoded motion video data before the decoder pass on the decoded data to the encoder. If the encoding format of the stored motion video data permits, i.e. the format of the motion video data before it is decoded, the temporal compression could be performed in the decoder upon receipt of the motion video data to decode or at the storage device. In case of the temporal compression being performed before the decoding, processing capacity is saved in the decoder. If the temporal compression is performed in the storage device additional performance savings is achieved in that the data transport load on the internal bus will be decreased even further.

Figure 8:
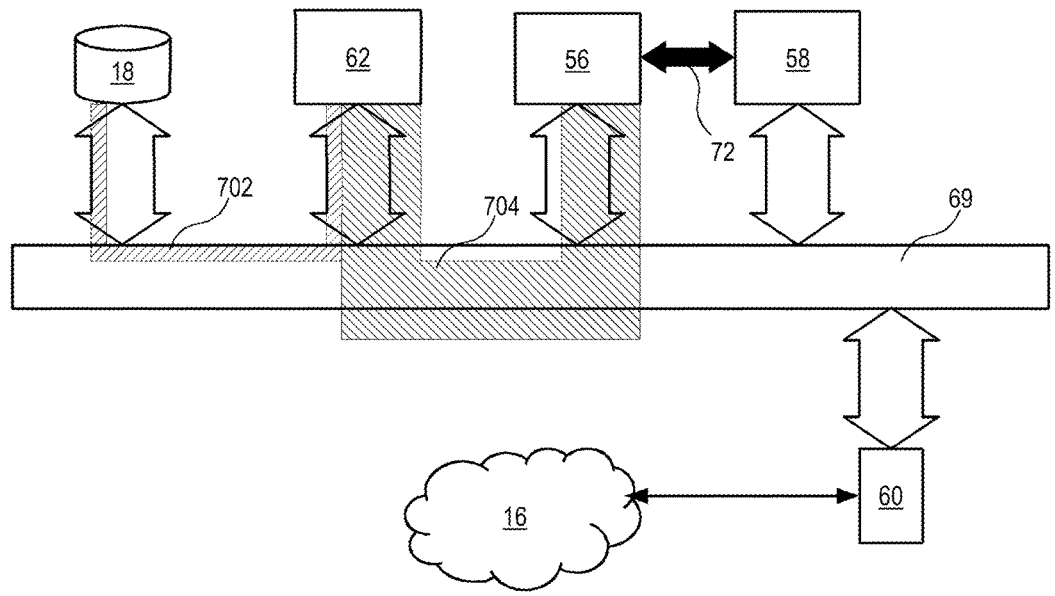
FIG. 8 shows a schematic block diagram depicting the bandwidth required on the internal bus according to a first example.
Figure 9:
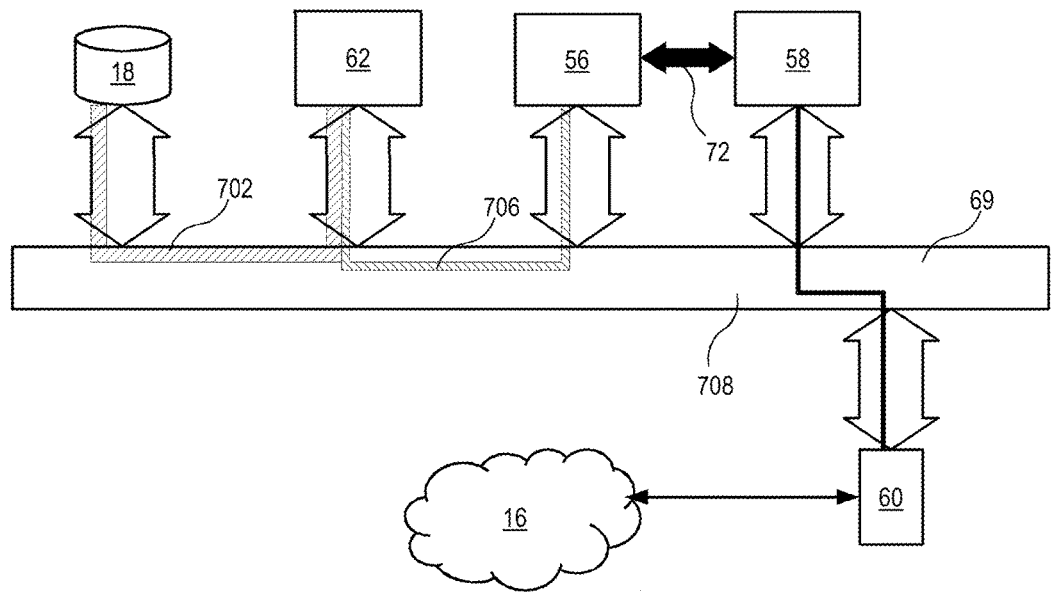
FIG. 9 shows a schematic block diagram depicting the bandwidth required on the internal bus according to a second example.

A more detailed explanation of one example of the temporal compression being introduced early in the conversion of the motion video data to a new frame rate is given below with reference to FIGS. 8 and 9. FIG. 8 shows a system where the stored motion video is transferred 702 from the storage device 18 to the decoder 62 in order to begin converting the playback speed of the motion video. The decoded motion video is then transferred 704 from the decoder 62 via the internal bus 69 to the image processor 56 and the encoder 58. The transfer of data between the image processor 56 and the encoder 58 may be performed via the internal bus or via a dedicated communication path 72. The video to be delivered in FIG. 8 is a video of ten times the speed of the original, i.e. fast forwarded ten times resulting in that a video sequence of 10 seconds in real life will be presented in 1 second. The encoded video stored at the storage device 18 then has to transfer 702 the video, which is encoded for viewing at normal speed, to the decoder 62 at ten times the data rate of the video encoded for viewing at normal speed. Let us assume that the data rate for encoded video for viewing at normal speed is 30 Mbit/s. The data rate 702 of the encoded motion video data from the storage device 18 to the encoder 58 at ten times fast forward is 10×30 Mbit/s=300 Mbit/s. Accordingly the transfer 702 from the storage device 18 to the decoder 62 occupies 300 Mbit/s of the available bandwidth of the internal bus 69. Then, in order to facilitate temporal compression of the motion video, the motion video is decoded at the decoder 62 and transferred 704 to the image processor 56. The data rate 704 of the motion video transferred from the decoder is about five times the data rate of the encoded motion video and it still have to be transferred at ten times higher speed, because the motion video is to represent the fast forwarded motion video. The increase of five times in data rate is a result of the encoder normally encode a motion video to 20% of the original size, therefore the video data will increase by five times when decoded. The resulting data rate leaving the decoder 62 is then 5×300 Mbit/s=1.5 Gbit/s. In the example, the data rate 704 becomes too high for the internal bus 69 to handle, symbolized in FIG. 8 by the transfer bandwidth 704 extending outside the width of the data bus 69. Accordingly, the system described in connection with FIG. 8 will not be able to deliver the motion video at the requested playback speed.

When the bandwidth required on the internal bus 69 for providing a higher play back speed is not enough, e.g. because of the internal bus is too restricted in size. The bus may be too restricted in size due to the bus actually being too small or because the utilization of the bus by other processes is high. In FIG. 9 a solution according to one of the above embodiments is depicted. The motion video is, as in the example of FIG. 8, requested to be played back at 10 times the normal play back speed. Hence, the same data rate 702, i.e. 300 Mbit/s, is utilised for transfer from the storage device 18 to the decoder 62. However, in this embodiment the temporal compression is performed in the decoder. This means that the data rate of the decoded motion video data, being 5×300 Mbit/s=1.5 Gbit/s as discussed in connection with FIG. 8, is decreased substantially by a factor 10 because of the data rate of the motion video data after temporal compression corresponds to the data rate of a motion video at normal playback. Hence, the required data rate on the internal bus for the transfer 706 of the decoded and temporally compressed motion video data is 1.5/10 Gbit/s=150 Mbit/s. This leaves plenty of bandwidth for other processes and especially for the transfer of the later encoded requested motion video 708.

What is claimed is:

1. A method for playback of motion video, the method comprising:
    requesting, via a communication network, streaming of a specific motion video sequence from a motion video storage device to a motion video playback device;
    streaming motion video data of the requested motion video sequence from the motion video data storage device to the motion video playback device;
    displaying the streamed motion video data on a display connected to the playback device as the streamed motion video data is received at the playback device;
    sending a request of change of playback speed to the motion video data storage device;
    in response to receiving the request of change of playback speed at the motion video data storage device the following acts are performed:
        decoding, in a decoder of the motion video data storage device, motion video data from a temporal position in the specific motion video sequence that has not yet been streamed to the motion video playback device;
        compressing, in respect of time, the decoded motion video data;
        transmitting the compressed motion video data to an encoder of the motion video data storage device, via an internal bus of the motion video data storage device that is coupled to the encoder, to the decoder, to a storage device of the motion video data storage device, and to a network interface of the motion video data storage device;
        encoding, in the encoder of the motion video data storage device, the compressed motion video data using an encoding scheme corresponding to an encoding scheme used to encode the specific motion video sequence; and
        continuing streaming the motion video sequence to the motion video playback device using the compressed and encoded motion video data,
    wherein the compressing of the decoded motion video data is performed by the decoder before the motion video data is transmitted on the internal data bus to the encoder.

2. The method according to claim 1, wherein the compressing of the decoded motion video data is performed before the motion video data is sent on an internal data bus of the motion video data storage device.

3. The method according to claim 1, wherein the compressing, in respect of time, of the decoded motion video data comprises selecting every n:th frame of the decoded motion video data for compressing, in respect of time, the motion video data, wherein n is a value relating to the requested playback speed.

4. The method according to claim 1, wherein motion video data of the specific motion video sequence is set to be played back at a predetermined frame rate and wherein the playback frame rate is not changed when the change of playback speed is executed.

5. The method according to claim 3, wherein the motion video data of the specific motion video sequence stored at the motion video data storage device includes subsets of motion video data, each motion video data subset representing an image frame in the motion video sequence, wherein at least some of the motion video data subsets does not include enough motion video data for recreating the image frame it represents without relying on motion video data from other motion video data subsets of the motion video sequence, wherein the decoding of motion video data includes generating motion video data subsets each including enough information to recreate at least each of the image frames selected in the act of compressing without using motion video data from another subset.

6. The method according to claim 4, wherein the motion video data of the specific motion video sequence stored at the motion video data storage device includes subsets of motion video data, each motion video data subset representing an image frame in the motion video sequence, wherein at least some of the motion video data subsets does not include enough motion video data for recreating the image frame it represents without relying on motion video data from other motion video data subsets of the motion video sequence, wherein the decoding of motion video data includes generating motion video data subsets each including enough information to recreate at least each of the image frames selected in the act of compressing without using motion video data from another subset.

7. The method according to claim 1, wherein the motion video data of the specific motion video sequence stored at the motion video data storage device includes subsets of motion video data, each motion video data subset representing an image frame in the motion video sequence and the image frames being sequentially related in chronological order, and wherein the receipt of the request of change of playback speed initiates the decoding of motion video data subsets arranged later in the chronological sequence than the motion video data subset presently being processed for streaming.

8. The method according to claim 7, wherein the first motion video data subset being decoded is the motion video data subset representing the image frame being the next frame in the chronological sequence in relation to the motion video data subset presently being processed for streaming.

9. The method according to claim 3, wherein n is a value greater than or equal to two.

10. The method according to claim 1, wherein the motion video data storage device is a networked enabled camera including an image sensor and the motion video sequence is a motion video sequence captured by the image sensor.

11. The method according to claim 1, further comprising receiving motion video to be stored at the motion video data storage device from an image capturing device via a direct connection between the image capturing device and the motion video data storage device.

12. The method according to claim 1, wherein a motion video data subset corresponding to an image frame received at the motion video playback device is discarded from the motion video playback device when the image frame has been displayed.

13. A method for playback of motion video, the method comprising:
 requesting, via a communication network, streaming of a specific motion video sequence from a motion video storage device to a motion video playback device;
 streaming motion video data of the requested motion video sequence from the motion video data storage device to the motion video playback device;
 displaying the streamed motion video data on a display connected to the playback device as the streamed motion video data is received at the playback device;
 sending a request of change of playback speed to the motion video data storage device;
 in response to receiving the request of change of playback speed at the motion video data storage device the following acts are performed:
  decoding, in a decoder of the motion video data storage device, motion video data from a temporal position in the specific motion video sequence that has not yet been streamed to the motion video playback device;
  compressing, in respect of time, the decoded motion video data;
  transmitting the compressed motion video data to an encoder of the motion video data storage device, via an internal bus of the motion video data storage device that is coupled to the encoder and to the decoder;
  encoding, in the encoder of the motion video data storage device, the compressed motion video data using an encoding scheme corresponding to an encoding scheme used to encode the specific motion video sequence; and
  continuing streaming the motion video sequence to the motion video playback device using the compressed and encoded motion video data,
 wherein the compressing of the decoded motion video data is performed by the decoder before the motion video data is transmitted on the internal data bus to the encoder.

14. The method of claim 13, wherein the internal bus is also coupled to a storage device of the motion video data storage device and to a network interface of the motion video data storage device.

15. The method of claim 14, wherein:
 requesting streaming of the specific motion video sequence further comprises request streaming of the specific motion video sequence over a stream;
 streaming the motion video data further comprises streaming the motion video data over the stream; and
 continuing streaming further comprises continuing streaming the motion video sequence over the stream,
 wherein the change of playback speed is transparent to the motion video playback device.

* * * * *